CIRCUITS FOR THE SIMULTANEOUS AMPLIFICATION OF AN ORIGINAL SIGNAL AND A SIGNAL DERIVED THEREFROM

Filed June 27, 1962

INVENTOR

E. M. C. Rorbaek Madsen,

BY Watson Cole Grindle & Watson

ATTORNEYS 3,251,942

CIRCUITS FOR THE SIMULTANEOUS AMPLIFICATION OF AN ORIGINAL SIGNAL AND A SIGNAL DERIVED THEREFROM

Erik Markvard Christopher Rorbaek Madsen, Gimsingehoje, Struer, Denmark

Filed June 27, 1962, Ser. No. 205,679
Claims priority, application Denmark, June 29, 1961, 2,682/61
4 Claims. (Cl. 179—1)

Figure 1:
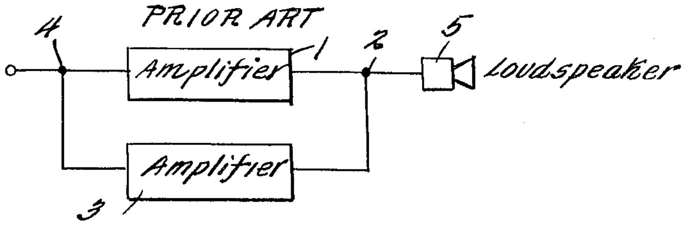

This invention relates to a circuit for the simultaneous amplification of an original signal and a signal derived therefrom. This problem is to be solved e.g. in the so-called reverberation control of sound reproduction by means of amplifiers or radio receivers, where a reverberation signal is derived from the original sound information signal at a time displacement such that when said derived signal is reproduced together with the original signal, a sound impression will be obtained similar to that of reverberating sound in a space confined wholly or partly by sound reflecting walls. Thus, in this case, a desired derived signal is reproduced simultaneously with the original signal. However, there are also cases where a derived signal is undesirable but inevitable. As an example of this, reference is made to microphone-loudspeaker-systems with acoustic feed-back from loudspeaker to microphone. The acoustic feed-back signal may in this case be of great inconvenience, because it may sometimes be difficult to avoid a so strong feed-back that self oscillation of the system occurs, i.e. a howling tone is produced.

The same drawback may occur if it is attempted, in a system for reverberation control, to feed the derived signal back to the channel of the original signal, because the feed-back will then be quite analogous to the acoustic feed-back in a microphone-loudspeaker system.

Thus, entirely analogous problems are present in the two cases described, and there are many other instances where similar problems are encountered in connection with the simultaneous amplification of an original signal and a derived signal. It is the object of the invention to devise simple and efficient means for solving problems of this nature.

Considering first reverberation control, the difficulties that may arise from self oscillation have been avoided by using mutually entirely independent amplifiers, each provided with a complete sound reproduction system, for the original and the derived signal, respectively. The original signal is fed in conventional manner through an amplifier channel belonging thereto, to one or more loudspeakers. From the output signal of this amplifier channel, a signal is derived through a reverberation simulator, which is an apparatus capable of deriving, from a signal supplied thereto, a delayed signal of similar character as the reverberation signal which is produced acoustically in a confined space, e.g. in a concert hall or auditorium. The most usual form of a reverberation simulator consists of a helical spring to one end of which the original signal is applied by means of an electrical-mechanical transducer, and from the other end of which the derived signal is picked up by means of a mechanical-electrical transducer. The signal travels through the spring in the form of a mechanical oscillation which is reflected several times from one end to the other at a constantly decreasing amplitude, similarly as sound waves are reflected several times between the walls of a room. The derived signal is then supplied to a second amplifier channel provided with a loudspeaker of its own, so that it is reproduced together with the original signal but entirely independently of the latter. By supplying a greater or smaller proportion of the derived signal to the channel serving to amplify same, the proportion between the reproduced original and the reproduced derived signal, and thereby the reverberation effect or in other words the impression of reverberation time, can be controlled.

According to the invention, a circuit for the simultaneous amplification of an original signal and a signal derived therefrom comprises two amplifier channels having substantially the same amplifying factor, and means for coupling a derived sum or difference signal from the outputs of said channels to the inputs of same in mutual phase opposition or in phase equality, respectively.

A circuit of this kind has the feature in common with a feed-back circuit, that a signal is fed back from the output to the input. However, the new circuit differs fundamentally from a conventional feed-back circuit in that the feed-back signal, after having been amplified, is not fed back again. Thus, while the characteristic of a conventional feed-back circuit is that the same signal circles around in the circuit ad infinitum and is amplified at each passage, the signal is fed back once only in the circuit according to the invention, because the signal, upon having been fed back once and having been amplified in the two channels, produces the sum signal, or difference signal, respectively, zero at the common output, or in other words no resulting amplified signal that is fed back again.

If now, in a reverberation control system, the sound reproducer is connected to the output of one amplifier, both the original signal and the derived signal will be reproduced by the sound reproducer. Thus, the other amplifier channel serves the purpose so to speak of breaking the feed-back after the output signal has been fed back once. Consequently, as distinct from a conventional feed-back circuit, there is no possibility of the progressive building up of a signal amplitude, and there is therefore no danger of self oscillation. This applies even if the derived signal is made very great, even many times greater than the original signal.

It will be seen that the only extra equipment required for obtaining this effect is an extra amplifier channel while the sound reproducer is the same for the original and the derived signal.

In the case of a stereo amplifier system, an additional simplification may be obtained according to the invention by using the existing left and right channels of a stereo amplifier as the two channels of the circuit according to the invention. In this case, the reverberation control according to the invention does not require any extra equipment whatsoever, disregarding the reverberation simulator itself.

Figure 2:
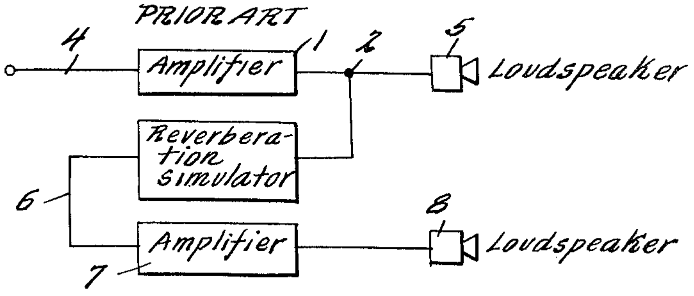

The invention will now be described in further detail with reference to the accompanying drawing in which:

FIG. 1 shows a diagram of a conventional amplifier with feed-back,

FIG. 2 a diagram of a known amplifier circuit with reverberation control, and

Figure 3:
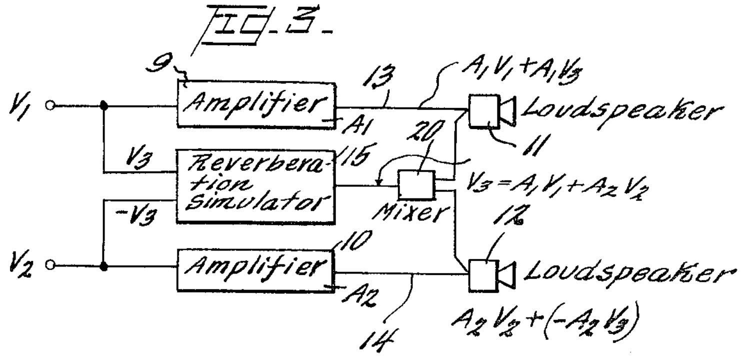

FIG. 3 a diagram of a stereo amplifier circuit according to the invention, with reverberation control.

FIG. 1 illustrates the principle of a conventional feed-back. 1 is an amplifier from the output 2 of which a signal is fed back to the input 4 of the amplifier through a feed-back unit 3. A loudspeaker 5 is connected to the output 2 of the amplifier 1.

It is assumed that the original input signal is $v_1$ and the amplification or gain factor $A_1$. After the amplified signal has passed through the feed-back unit 3, which may be an ordinary feed-back circuit, a reverberation unit or the acoustic feed-back between the loudspeakers in an auditorium and the microphone, a signal $v_3$ is produced which is again amplified in the amplifier 1 and thus produces a signal $A_1v_3$ at the output of the amplifier. To ensure stability of the amplifier, $A_1v_3$ should be appreciably less than $A_1v_1$, i.e. the feed-back signal should be considerably weaker than the original signal.

If it is attempted to use an amplifier of the type shown in FIG. 1 for reverberation control, the reverberation signal must therefore be kept appreciably smaller than the original signal, which is sometimes not satisfactory.

For reverberation control, the circuit illustrated in FIG. 2 has therefore been used in which the output signal of the amplifier is not fed back to the input 4 of the same amplifier but to the input 6 of a second amplifier 7 having a loudspeaker 8 of its own. Consequently, only the original signal $A_1v_1$ appears at the loudspeaker 5, while a pure reverberation signal $A_2v_3$ appears at the loudspeaker 8, $A_2$ signifying the amplification or gain factor of the amplifier 7. This system is stable as long as no other feed-back paths than that illustrated have to be considered. It is a disadvantage of this system, however, that an additional amplifier 7 with a loudspeaker 8 of its own has to be used.

FIG. 3 illustrates how the principle of the invention may be applied to a stereo amplifier. In FIG. 3, 9 is a first amplifier channel and 10 a second amplifier channel. Two loudspeakers 11 and 12 for reproducing the left and right signal respectively of stereophonic information are connected to the amplifier channels 9 and 10, respectively. The outputs 13 and 14 of the amplifiers 9 and 10, respectively, are coupled back to the inputs of the amplifiers through a common feed-back unit 15 comprising a reverberation simulator. The coupling through the feed-back circuits may be done by way of mixer block 20 with conventional circuits of the type shown in the Byrd U.S. Patent No. 2,791,629 or in Bertram U.S. Patent No. 2,845,491. In this manner, either the sum signal may be fed back to the input of the two channels in phase opposition, or a difference signal in phase equality.

If the two original signals of the stereophonic information are $v_1$ and $v_2$ respectively, and the amplification factors of the two amplifiers 9 and 10 are $A_1$ and $A_2$ respectively, the original signal at the outputs of the amplifiers will be $A_1v_1$ and $A_2v_2$ respectively. Assuming that the alternative of feeding back a sum signal in phase opposition is selected, the voltage at the input of the reverberation simulator 15 will be $A_1v_1+A_2v_2$, whereby a signal $v_3$ is developed at the output of the reverberation simulator. The signal $v_3$ is supplied to the two amplifier channels in phase opposition and will produce output signals of the values $A_1v_3$ and $-A_2v_3$ respectively. At the input of the reverberation simulator, the signal $v_3$ will therefore produce the signal $$A_1v_3+(-A_2v_3)=v_3(A_1-A_2)$$

In the ideal case where $A_1=A_2$, the derived signal $v_3$ will therefore not be fed back a second time. If $A_1$ and $A_2$ are not mathematically identical, there will be some feedback left for the second passage, but this may easily be kept so low that there is no danger of self oscillation, even if $v_3$ is of an appreciable value as compared with $v_1$ and $v_2$.

I claim:

1. A circuit for adding artificial reverberation to a signal comprising two amplifier channels having substantially the same amplifying factor, means coupled to the outputs of said channels for producing a combined signal representation of the output signals of both said two channels, means for applying said combined signal to the input of a reverberation simulator, and means coupled to the output of said reverberation simulator for feeding back the output signal thereof to the inputs of both said amplifier channels in such phase that a resultant zero amplitude signal is produced from the combined signal at the combined outputs of the two amplifier channels.

2. A circuit as defined in claim 1, wherein the signals fed back are in phase opposition.

3. A circuit as defined in claim 1, wherein the signals fed back are in phase equality.

4. A circuit as in claim 1 in which the two channels are constituted by the two channels of a stereo amplifier.

References Cited by the Examiner

UNITED STATES PATENTS

| | | | |
|---|---|---|---|
| 2,462,532 | 2/1949 | Morris | 179—1.8 |
| 2,517,629 | 8/1960 | Buys et al. | 179—1.8 |
| 3,053,934 | 11/1962 | Gray | 179—1.3 |
| 3,079,463 | 2/1963 | Feldman | 179—1.3 |

FOREIGN PATENTS

| | | |
|---|---|---|
| 1,108,739 | 6/1961 | Germany. |

KATHLEEN H. CLAFFY, *Primary Examiner.*

WILLIAM C. COOPER, ROBERT H. ROSE, *Examiners.*

A. J. SANTROELLI, R. MURRAY, *Assistant Examiners.*